(12) United States Patent
Sauer et al.

(10) Patent No.: US 7,190,378 B2
(45) Date of Patent: Mar. 13, 2007

(54) USER INTERFACE FOR AUGMENTED AND VIRTUAL REALITY SYSTEMS

(75) Inventors: Frank Sauer, Princeton, NJ (US); Ali Khamene, Plainsboro, NJ (US); Lars Schimmang, Portsmouth (GB)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 10/222,284

(22) Filed: Aug. 16, 2002

(65) Prior Publication Data

US 2003/0063132 A1    Apr. 3, 2003

Related U.S. Application Data

(60) Provisional application No. 60/312,872, filed on Aug. 16, 2001, provisional application No. 60/312,876, filed on Aug. 16, 2001, provisional application No. 60/312,871, filed on Aug. 16, 2001, provisional application No. 60/312,875, filed on Aug. 16, 2001, provisional application No. 60/312,873, filed on Aug. 16, 2001.

(51) Int. Cl.
*G09G 5/00* (2006.01)
*G06F 17/00* (2006.01)
*G06F 9/00* (2006.01)

(52) U.S. Cl. .................... 345/633; 345/156; 345/8; 715/856; 715/773

(58) Field of Classification Search ............... 345/633, 345/418, 619–621, 632, 638, 771–773, 810–811, 345/835–836, 856–860, 862–863, 156–158, 345/7–8, 169–173; 715/856–860, 862–863, 715/810–811, 835–836, 800, 771–773
See application file for complete search history.

(56) References Cited

U.S. PATENT DOCUMENTS

| 5,177,474 | A | * | 1/1993 | Kadota ..................... 345/642 |
| 5,808,601 | A | * | 9/1998 | Leah et al. ................ 715/856 |
| 6,084,589 | A | * | 7/2000 | Shima ....................... 345/419 |
| 6,124,843 | A | * | 9/2000 | Kodama ..................... 715/856 |
| 6,184,847 | B1 | * | 2/2001 | Fateh et al. .................. 345/8 |
| 6,240,444 | B1 | * | 5/2001 | Fin et al. ................... 709/205 |
| 6,297,804 | B1 | * | 10/2001 | Kashitani ................... 345/157 |
| 6,468,212 | B1 | * | 10/2002 | Scott et al. ................. 600/437 |

* cited by examiner

*Primary Examiner*—Wesner Sajous
(74) *Attorney, Agent, or Firm*—Michele L. Conover

(57) ABSTRACT

A user interface for augmented reality (AR) systems and virtual reality (VR) systems which include a computer and virtual graphics and in which a user experiences a virtual viewing direction, includes: a virtual line pointer included in the virtual graphics and fixed with respect to the virtual viewing direction; a representation of the virtual line pointer to the user; and a user-operable device coupled to the computer for optionally marking an object intersecting the virtual line pointer.

19 Claims, 5 Drawing Sheets

USER INTERFACE FOR AUGMENTED AND VIRTUAL REALITY SYSTEMS

CROSS REFERENCE TO RELATED APPLICATIONS

Reference is hereby made to the following U.S. Provisional patent applications whereof the benefit is hereby claimed and the disclosures hereby incorporated by reference:

U.S. Provisional patent application No. 60/312,872, entitled MARKING 3D LOCATIONS FROM ULTRASOUND IMAGES and filed Aug. 16, 2001 in the names of Frank Sauer, Ali Khamene, Benedicte Bascle;

U.S. Provisional patent application No. 60/312,876, entitled LOCAL 3D RECONSTRUCTION FROM ULTRASOUND IMAGES and filed Aug. 16, 2001 in the names of Frank Sauer, and Ali Khamene, Benedict Bascle;

U.S. Provisional patent No. 60/312,871, entitled SPATIOTEMPORAL FREEZING OF ULTRASOUND IMAGES IN AUGMENTED REALITY VISUALIZATION and filed Aug. 16, 2001 in the names of Frank Sauer, Ali Khamene, Benedicte Bascle;

U.S. Provisional patent application No. 60/312,875, entitled USER INTERFACE FOR AUGMENTED AND VIRTUAL REALITY SYSTEMS and filed Aug. 16, 2001 in the names of Frank Sauer, Lars Schimmang, Ali Khamene; and U.S. Provisional patent application No. 60/312,873, entitled VIDEO-ASSISTANCE FOR ULTRASOUND GUIDED NEEDLE BIOPSY and filed Aug. 16, 2001 in the names of Frank Sauer and Ali Khamene.

Reference is hereby made to the following copending U.S. patent applications being filed in even date herewith.

U.S. pending patent application Ser. No. 10/222,308, filed on Aug. 16, 2002 entitled MARKING 3D LOCATIONS FROM ULTRASOUND IMAGES filed in the names of Frank Sauer, Ali Khamene, Benedict Bascle;

U.S. pending patent application Ser. No. 10/222,182 filed on Aug. 16, 2002 entitled LOCAL 3D RECONSTRUCTION FROM ULTRASOUND IMAGES and filed in the names of Frank Sauer, All Khamene, Benedict Bascle; and U.S. Pat. No. 6,695,779, granted on Feb. 24, 2004 entitled SPATIOTEMPORAL FREEZING OF ULTRASOUND IMAGES IN AUGMENTED REALITY VISUALIZATION and filed in the names of Frank Sauer, Ali Khamene, Benedict Bascle.

U.S. Pat. No. 6,612,991, granted on Sep. 2, 2003 entitled VIDEO-ASSISTANCE FOR ULTRASOUND GUIDED NEEDLE BIOPSY and filed in the names of Frank Sauer and Ali Khamene.

FIELD OF THE INVENTION

The present invention relates to imaging systems and, more particularly to virtual reality systems.

BACKGROUND OF THE INVENTION

Virtual Reality systems immerse the user in a virtual world. Essentially all visual stimulation is blocked out except that provided by a computer. Augmented Reality systems show the user a real world view with virtual graphics superimposed thereupon. Both kinds of systems have a feature in common in that they track the user's head or, as the case may be, the user's viewpoint, so that the graphics can be rendered from the user's viewpoint. When the user changes his position or moves his head, the virtual or augmented view is changed accordingly.

FIG. 1 show a schematic block diagram of an augmented reality system as may be utilized in conjunction with features of the invention. A tracker camera 10 is coupled by way of and A/D (analog to digital) converter 12 to a programmable digital computer 14. Two scene cameras 16 are coupled to computer 14. An ultrasound scanner 16, having a transducer 18, is coupled by way of an A/D converter 20 to computer 14. A head-mounted display (HMD) control unit 22 is coupled for signal interchange with computer 14 and to an HMD display 24.

Augmented Reality visualization of ultrasound images has been proposed in the literature; see for exampled, M. Bajura, H. Fuchs, and R. Ohbuchi. "Merging Virtual Objects with the Real World: Seeing Ultrasound Imagery within the Patient." Proceedings of SIGGRAPH '92 (Chicago, Ill., Jul. 26–31, 1992). In Computer Graphics 26, #2 (Jul. 1992): 20

Helpful background material on augmented reality and related topics can be found in Proceedings of the IEEE and ACM International Symposium on Augmented Reality 2000, dated Oct. 5–6, 2000; Munich, Germany; IEEE Computer Society, Los Alamitos, Calif., U.S.A. In the above-cited Proceedings, an article of particular interest entitled AUGMENTED WORKSPACE: DESIGNING AN AR TESTBED is published on pages 47–53, and is authored by Frank Sauer, an inventor in the present application, et alii.

See also the review article by R. T. Azuma: "A Survey of Augmented Reality", Presence: Teleoperators and Virtual Environments, 6(4), 355–386, (1997).

SUMMARY OF THE INVENTION

In one embodiment, the artificial (virtual or augmented) view is shown to the user using a head-mounted display.

It is herein recognized that certain problems present themselves with regard to the user interface problem in Virtual Reality (VR) and Augmented Reality (AR). In particular, the questions of how a user points to a location in the Virtual or Augmented world, how does a user select an object, and how does user place a marker.

It is furthermore herein recognized that the following are possible: computer mouse-like or trackball-like input devices operated by hand or foot control; tracked pointers, possibly equipped with buttons or switches; and other external devices operated by the user that allow a user to input spatial information into the computer.

It is furthermore herein recognized that typically two different functions have to be combined in such a spatial information input device: a pointing function and a trigger function. For pointing, for example, the user moves the mouse until the pointer is in the desired location; for triggering, the user "clicks" the mouse button to activate their choice.

In accordance with an aspect of the present invention, the pointing function is separated from the trigger function; the pointing function is related to the pose of the user's head. The pose of the user's head is known as it is being tracked in the VR or AR system.

BRIEF DESCRIPTION OF THE DRAWINGS

The invention will be more fully understood from the following detailed description of preferred embodiments, in conjunction with the Drawing in which.

DETAILED DESCRIPTION

Figure 1:
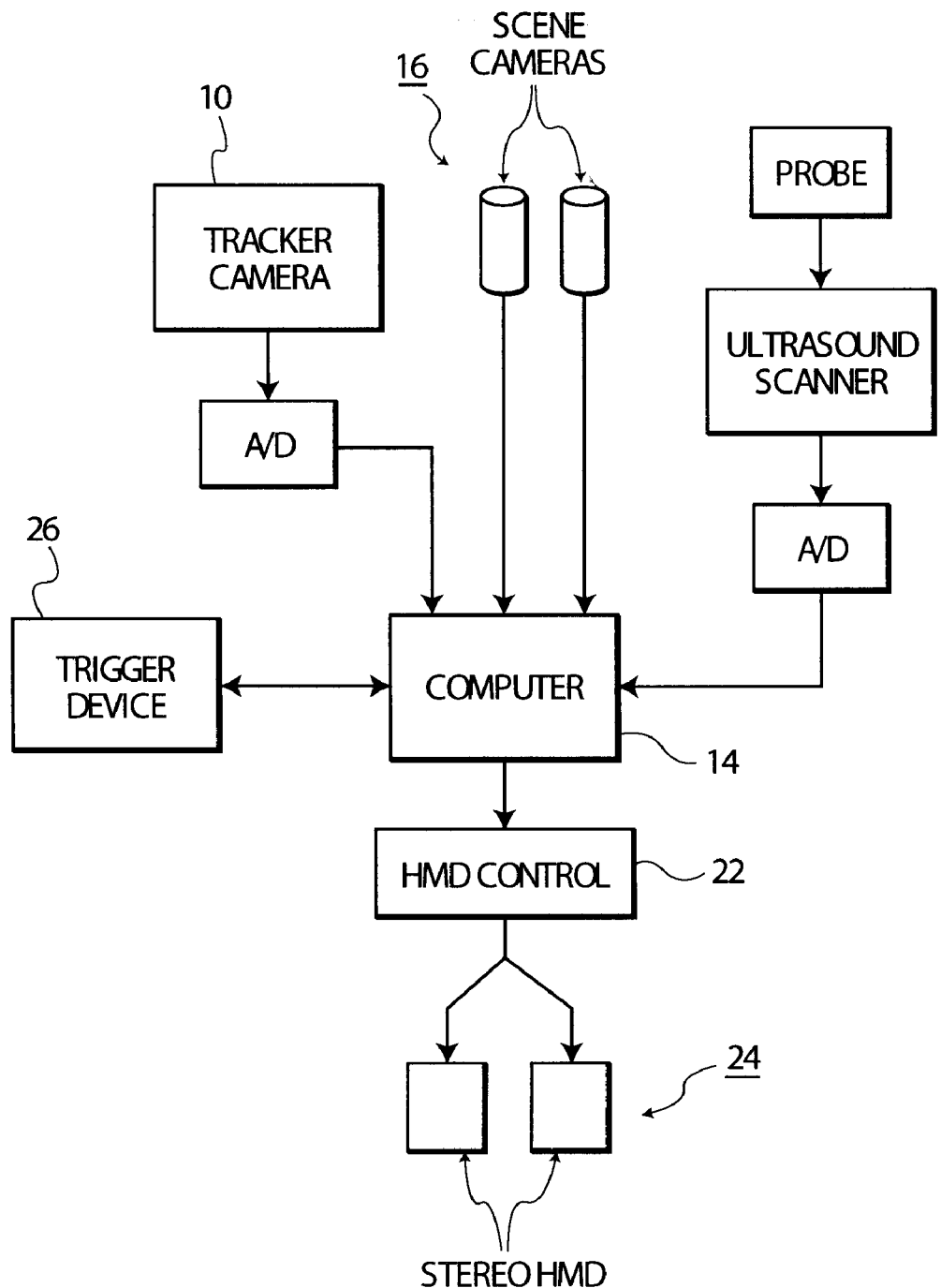
FIG. 1 shows a block diagram of an augmented reality system.
Figure 3:
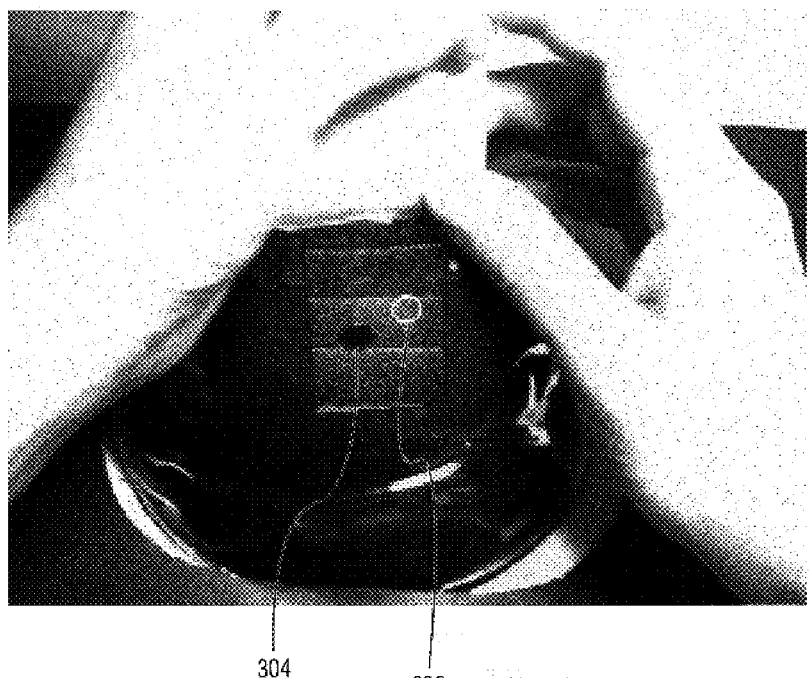
FIG. 3 shows an exemplary view of a user interface for the augmented reality system of FIG. 1 in which a virtual line pointer is visible, but not aligned with a target in accordance with the present invention.
Figure 4:
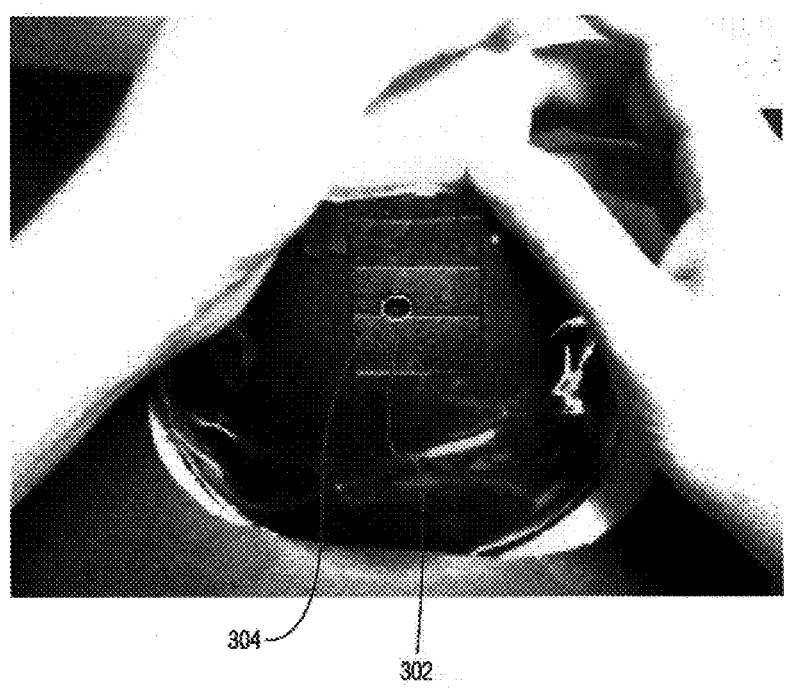
FIG. 4 shows an exemplary view of the user interface of FIG. 3 in which the virtual line pointer is aligned with the target in accordance with the present invention.
Figure 5:
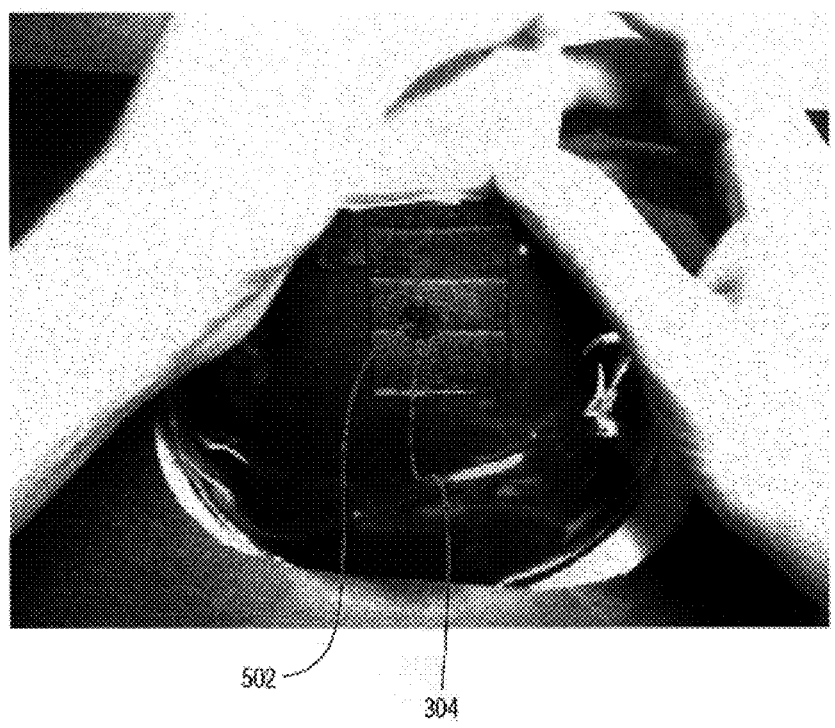
FIG. 5 shows an exemplary view of the user interface of FIG. 3 in which the target has been marked by a marker in accordance with the present invention.

In accordance with another aspect of the invention, a user interface for augmented reality (AR) systems and virtual reality (VR) systems which include a computer 14 and virtual graphics (FIGS. 3–5) and in which a user experiences a virtual viewing direction, includes: a virtual line pointer 302 included in the virtual graphics and fixed with respect to the virtual viewing direction; a representation of the virtual line pointer to the user; and a user-operable device 26 coupled to the computer for optionally marking an object intersecting the virtual line pointer using a marker 502 such as is shown in FIG. 5. As shown in FIG. 3, virtual line pointer 302 is visible but not aligned with a target 304. In FIG. 4, the user has turned his head so that the virtual line pointer 302 is points to the target 304. In FIG. 5, the user has activated the trigger device 26 (FIG. 1) and created a marker 502 to indicate his selection of the location that corresponds to the target 304.

Figure 2:
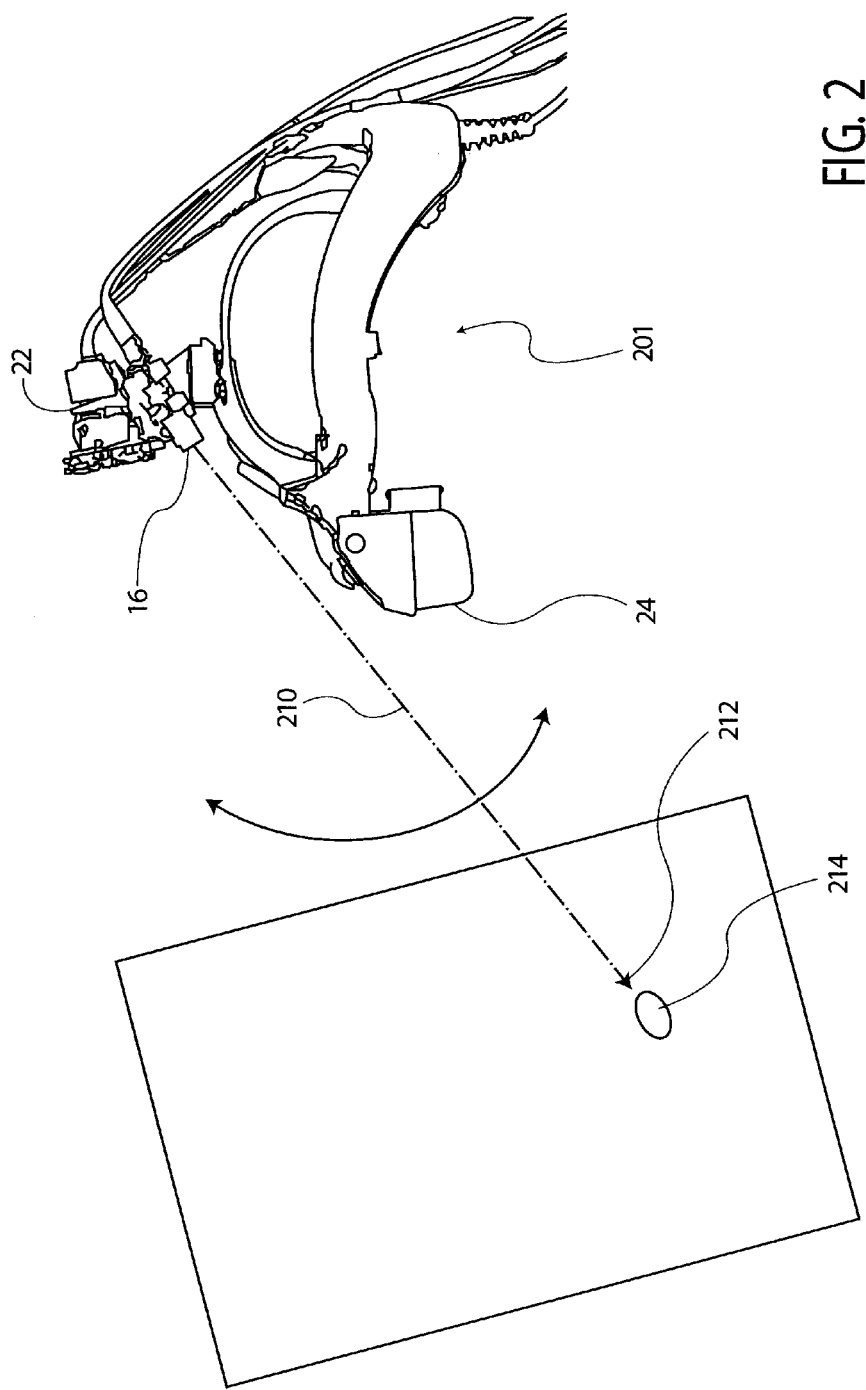
FIG. 2 shows a schematic diagram of an exemplary head-mounted device and a representation of a virtual line pointer in accordance with the present invention.

In accordance with another aspect of the present invention and as illustrated in FIG. 2, a user's line-of-sight is utilized as a pointer as represented by dashed line 210. The user sees the pointer through stereo Head Mounted Device (HMD) displays 24 which are operated by HMD control 22. It may be thought of as a virtual line, extending in the user's viewing direction as indicated by arrow 212, rigidly attached to the user's head or, more precisely, fixed with respect to the virtual or augmented viewpoint and viewing direction vis-á-vis imaging cameras 16 attached to a head mounted device 201, so that it moves along with user's head movements, always in the user's field-of-view. The user can make a selection by simply turning his head in a direction such that the virtual line points to the chosen object 214, or selected location. Then, the user has to activate his choice with a trigger interface device 26 provided by the system. The trigger interface may comprise any convenient device such as a pushbutton, a footswitch, a voice activated sensor, or other similar device.

In accordance with the principles of the invention, depending on the system in use, the virtual pointer preferably coincides with the optical axis of the virtual camera for a monoscopic system. In the event of a stereoscopic system, the virtual pointer preferably coincides with the optical axis of one of the two virtual cameras or with a line in between the two optical axes of a stereoscopic system.

The virtual camera is used to project the virtual 3D scene onto a virtual 2D image, shown to the user. For video-based AR, the virtual camera is matched to the real camera, so that a scene that includes real and virtual objects is being viewed from a common viewpoint.

In accordance with the principles of the invention, for a stereoscopic system: if the virtual pointer intersects a virtual object (or a real object, of which the 3D location is known), one can calculate the 3D position of this intersection. Hence, the position of this intersection can be visualized stereoscopically, giving the user a 3D perception. To the user, the virtual pointer can appear like a search-light that wanders over the surface of the virtual world (and the real world, if its 3D structure is known) according to the head movements of the operator or user.

In accordance with the principles of the invention, for a monoscopic system (monocular or binocular): depth information cannot really be displayed in a monoscopic view. The virtual pointer is simply displayed as a marker on or around the virtual camera's optical axis. The user has to align this marker with the desired location in the scene. He does not, in general, have the perception that the marker is on the object's surface. In a binocular system, the marker is preferably shown only to one eye, preferably the dominant eye. This visualization of the virtual pointer can also be used in a stereoscopic system, but is perceptually inferior to the one where the marker appears on the object's surface.

In principle, a stereoscopic system provides the option of replacing the virtual line pointer with a point on that line, i.e. to show the pointer tip at a fixed distance to the user. This would allow the user, for example, to "depress" a virtual button in the scene by first aligning the virtual pointer tip on top of the virtual button, then moving the head forward to "press in" the virtual button. This method, in accordance with the principles of the invention, combines pointing and triggering within the same interface.

Various convenient shapes are possible for an embodiment of markers that visualize the virtual pointer in accordance with the invention, including a circle, a cross, or an arrow.

By way of a further exemplary embodiment in accordance with the present invention follows, with consideration of 3D marking for AR ultrasound system. Considering a system where an ultrasound transducer is being tracked with respect to the user's viewpoint, the system shows an augmented view, in which the ultrasound image appears attached to the transducer, in the location where the actual scan is being performed. Structures seen in the ultrasound image appear in the actual location of the physical structures that are being detected by the ultrasound scan. One can effectively employ the user interface described above to mark the location of structures on the ultrasound image. Preferably, a stereoscopic display is used, and the location of the virtual pointer is visualized in the augmented view as a circle in the plane of the ultrasound image. The method and apparatus of the present invention find application in a variety of apparatus such as, for example, the apparatus and methods disclosed in the aforesaid pending patent applications LOCAL 3D RECONSTRUCTION FROM ULTRASOUND IMAGES and MARKING 3D LOCATIONS FROM ULTRASOUND IMAGES.

While the invention has been explained by way of exemplary embodiments, it will be understood by one of skill in the art to which it pertains that various modifications and changes may be readily made without departing from the spirit of the invention which is defined by the claims following.

What is claimed is:

1. A user interface for augmented reality (AR) systems and virtual reality (VR) systems which includes a computer and virtual graphics containing virtual objects positioned in three dimensional (3D) space and in which a user experiences a view of a 3D virtual or augmented scene which includes the virtual objects, and determines a viewpoint with the position of his head and a viewing direction with the orientation of his head, said interface comprising:

a graphical representation of said virtual line pointer to said user, the virtual line pointer extending from the user's viewpoint into a 3D virtual scene oriented along a user's line of sight and fixed to the user's head, the virtual line pointer controlled with regard to position and orientation by the user's head movements;

an intersection processor for calculating in the 3D virtual scene an intersection point of the virtual line pointer and a virtual object's surface, the intersection point accordingly being selected by the user's head movement and orientation; and a user operable device for triggering manipulation of the virtual scene at the selected intersection point.

2. A user interface as recited in claim 1, wherein said representation of said virtual line pointer is a search-light-like ray or beam.

3. A user interface as recited in claim 1, wherein said representation of said virtual line pointer is a mark at a perceived distance along the line of said virtual line pointer.

4. A user interface as recited in claim 3, wherein said perceived distance is variable so as to make said mark appear at a surface of said object intersecting said virtual line pointer.

5. A user interface as recited in claim 1, wherein said representation of said virtual line pointer is a mark positioned in the line of said virtual viewing direction.

6. A user interface as recited in claim 1, wherein said user-operable device is a switch.

7. A user interface as recited in claim 1, wherein said user-operable device is a speech recognition device.

8. A user interface as recited in claim 1, wherein said user-operable device is a virtual button included in said virtual graphics.

9. A user interface as recited in claim 8, wherein said virtual line pointer exhibits a tip at a perceived fixed length from said user's head and wherein said user-operable device is a virtual button included in said virtual graphics, said virtual button being triggered when said tip is placed thereupon and said user's head is moved forward such that said tip appears to move forward and press said virtual button.

10. A user interface as recited in claim 1, where said intersection is calculated as a 3D point.

11. A user interface as recited in claim 1, wherein the user-operable device confirms said intersection.

12. A user interface as recited in claim 11, wherein said confirming of the intersection selects the intersected said virtual object, for potential further manipulation.

13. A user interlace as recited in claim 11, where said confirming of the intersection places a graphical marker at the location of said intersection.

14. A user interface as recited in claim 8, wherein said virtual line pointer exhibits a tip at a perceived fixed length from said user's head and wherein said user-operable device is a virtual button included in said virtual graphics, said virtual button being triggered when said tip is placed thereupon and some pre-defined small head-movement is executed.

15. A user interface according to claim 1 wherein a manipulation performed by a user operable device comprises the steps of:

selecting a particular intersection point by recording 3D coordinates of the selected point;

placing markers at these coordinates in 3D space;

fixing the selected point in the virtual scene's world coordinate system; and having the selected point attach to the object so it moves along with the object.

16. A user interface according to claim 1 wherein a manipulation performed by a user operable device comprises the steps of:

selecting a complete object containing a selected intersection point; and changing the appearance of the whole object.

17. The method of claim 16 wherein the step of changing the appearance of the whole object comprises the step of:

deleting the whole object.

18. The method of claim 16 wherein the step of changing the appearance of the whole object comprises the step of:

highlighting the whole object.

19. The method of claim 16 wherein the step of changing the appearance of the whole object comprises the step of:

moving the whole object in drag and drop fashion.

* * * * *